(No Model.)

H. E. WILLSIE.
MAGAZINE CAMERA.

No. 568,422.   Patented Sept. 29, 1896.

2 Sheets—Sheet 1.

WITNESSES:
Jos S Perry
D. S. Ranck

INVENTOR:
H. E. Willsie (No Model.) 2 Sheets—Sheet 2.
H. E. WILLSIE.
MAGAZINE CAMERA.
No. 568,422. Patented Sept. 29, 1896.
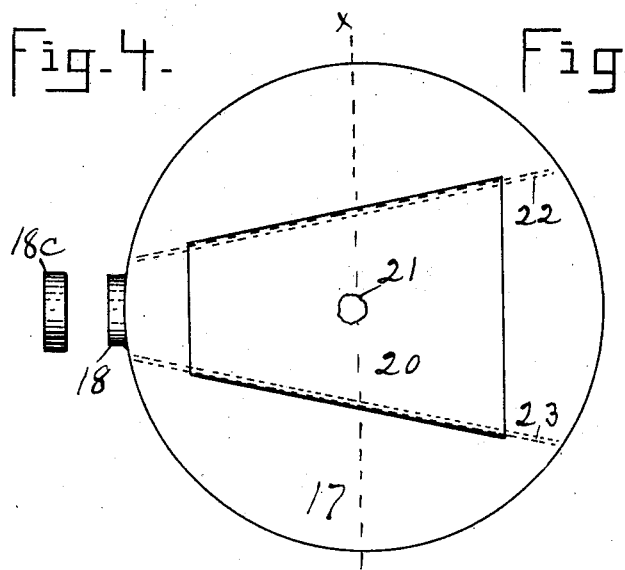
Fig-4-
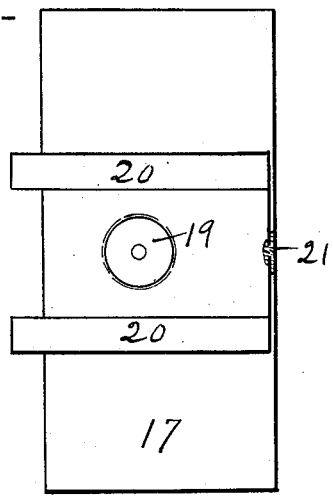
Fig-5-
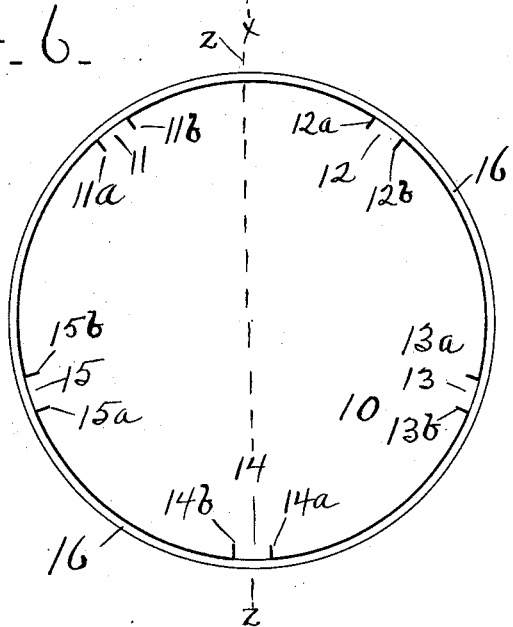
Fig-6-
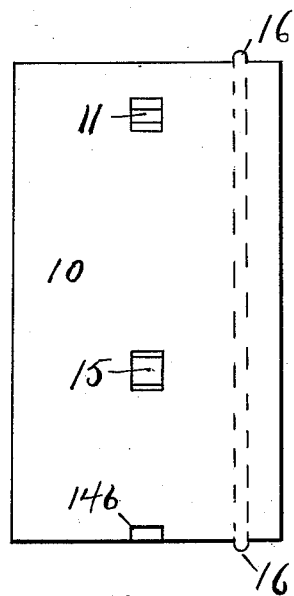
Fig-7-
WITNESSES:
INVENTOR:
H. E. Willsie

UNITED STATES PATENT OFFICE.

HENRY E. WILLSIE, OF LA CROSSE, WISCONSIN, ASSIGNOR, BY MESNE ASSIGNMENTS, TO THE CHICAGO CAMERA COMPANY, OF CHICAGO, ILLINOIS.

MAGAZINE-CAMERA.

SPECIFICATION forming part of Letters Patent No. 568,422, dated September 29, 1896.

Application filed July 10, 1895. Serial No. 555,592. (No model.)

*To all whom it may concern:*

Be it known that I, HENRY E. WILLSIE, a citizen of the United States, residing at La Crosse, in the county of La Crosse and State of Wisconsin, have invented a new and useful Photographic Camera, of which the following is a specification.

My invention relates to improvements in photographic cameras in which several sensitive plates or films may be successively exposed; and the objects of my improvements are to provide, in connection with a metal case and cover, means for holding the sensitive plates and for successively rotating them within the focus of the lens, means for protecting from the light those plates not being exposed, means for holding the lens, and means for registering the number of exposures made. I attain these objects by the mechanisms illustrated in the accompanying drawings, in which—

Figure 1:
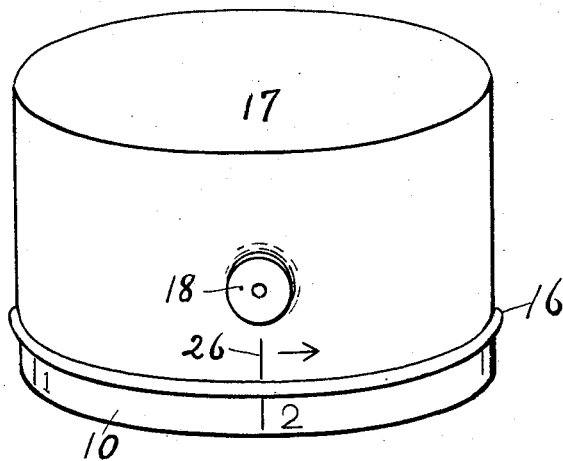
Figure 2:
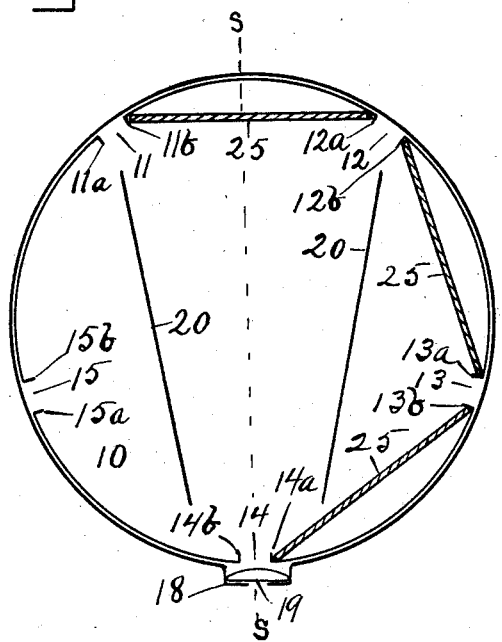
Figure 3:
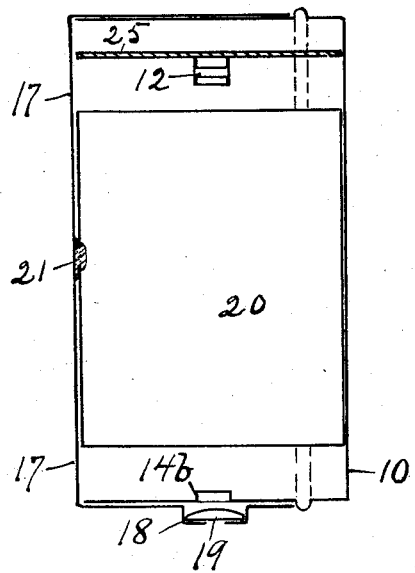

Figure 1 is a perspective view of the camera; Fig. 2, a cross-section of the camera, showing some of the sensitive plates in position; Fig. 3, a vertical section of the camera on the line $s$ $s$, Fig. 2; Fig. 4, an interior view of the cover; Fig. 5, a vertical section of the cover on the line $x$ $x$, Fig. 4; Fig. 6, an interior view of the case; and Fig. 7, a vertical view of the case on the line $z$ $z$, Fig. 6.

Similar figures refer to similar parts throughout the several views.

The construction of my invention is as follows: The camera-case 10 (see Figs. 6 and 7) is a metal cylinder closed at one end. In the convex surface of this cylinder are five perforations 11, 12, 13, 14, and 15, equal distances apart. In making these perforations the metal is bent inward, so as to form the lips $11^a$ $11^b$ $12^a$ $12^b$, &c. The case is also provided with a raised bead or ridge 16. The cover 17 (see Figs. 4 and 5) is also a metal cylinder closed at one end. This cover is adapted to fit closely over the case. In the convex surface of the cover is a pressed projection 18 of a proper size to receive the lens 19. The lens is usually secured in this receptacle 18 by means of a little cement. A metal cap $18^c$ fits over the lens-receptacle 18. Other caps may be provided with various-sized apertures, so as to form stops for differently-timed exposures.

Secured to the inside of the cover is the partition 20, which consists of a strip of sheet metal having two edges bent in the manner shown. This partition is secured to the cover by means of the solder 21. To facilitate the soldering, a small hole is punched in the partition.

The sides of the partition are usually extended by means of the pieces 22 and 23, (shown in dotted lines in Fig. 4,) which are glued or otherwise cemented to the sides of the partition. The material of these pieces 22 and 23 may be black rubber or black velvet. The material should be somewhat elastic and flexible. All of the inside of the camera is colored dull black.

The operation of my invention is as follows: In a dark room the case is loaded with sensitive plates 25 25. In the camera shown not more than five sensitive plates can be inserted at one time. These plates are held in position by the metal lips $11^b$ $12^a$ $12^b$ $13^a$, &c. The case and cover are then put together so as to form a closed cylindrical box, as shown in Fig. 1. The raised ridge 16 prevents light entering the camera between the case and the cover. To make an exposure, the cover is turned on the case until the mark "26" on the cover corresponds with one of the five similar marks on the case. The marks on the case are numbered from "1" to "5." The cap is then removed. The light enters the aperture into the projection 18, passes through the lens 19 and through the perforation in the case, and is focused upon the sensitive plate 25. The sides of the partition 20 prevent the light spreading to the other plates. When the exposure is completed, the cap is replaced, and the cover is turned until the mark "26" is between two of the numbered marks on the case. When the cover is in this position, the cap may be removed to place stops for time-exposures. An exposure may readily be made by using a finger-tip instead of a cap.

The number of perforations in the case need not always be five, but some odd number of perforations, as three, seven, or nine, must be used in order that a perforation will be exactly opposite a sensitive plate.

Having now fully described my invention, what I claim, and desire to secure by Letters Patent, is—

1. A photographic camera having in combination a casing, a lens mounted therein, a revolving series of holders forming sensitized surfaces, mounted within said casing said holders being located at a distance apart for the passage of light between them from one side of the casing to the opposite holder or sensitized surface therein; and light stops or partitions extending from said lens to the opposite holder, substantially as set forth.

2. A photographic camera, consisting of a case provided with an odd number of perforations and with means for holding the sensitive plates in place, a cover provided with a lens-receptacle, a partition secured within said cover for the purpose specified, and a lens.

3. A photographic camera consisting of a cylindrical metal case provided with an odd number of equally-distant perforations in the convex surface thereof, and with lips, adapted to hold the sensitive plates in place, formed by turning the metal from said perforations toward the interior of the case; a cylindrical metal cover having a lens-receptacle integral therewith, a partition secured within said cover for the described purpose, a lens, and means for indicating the number of exposures made.

4. A photographic camera consisting of a cylindrical metal case provided with five equally-distant perforations in the convex surface of said case, and with lips, adapted to hold the sensitive plates in place, formed by turning the metal from said perforations toward the interior of the case, and with the raised ridge 16; a cylindrical metal cover having a lens-receptacle integral therewith, the described partition soldered to said cover, a lens; and marks on said case and cover adapted to indicate the number of exposures made.

H. E. WILLSIE.

Witnesses:
J. B. SPERRY,
WALTER A. BALLARD.